United States Patent [19]

Mettes et al.

[11] Patent Number: 4,868,565

[45] Date of Patent: Sep. 19, 1989

[54] SHIELDED CABLE

[75] Inventors: Hal J. Mettes, Billings, Mont.; Richard L. Bocock, Austin, Tex.

[73] Assignee: Schlumberger Technology Corporation, Houston, Tex.

[21] Appl. No.: 146,069

[22] Filed: Jan. 20, 1988

[51] Int. Cl.[4] .......... G01V 1/00

[52] U.S. Cl. .......... 340/856; 174/36; 174/126.2

[58] Field of Search .......... 174/36, 109, 126 CP; 333/243; 367/76, 81; 340/853, 856, 857

[56] References Cited

U.S. PATENT DOCUMENTS

| | | | |
|---|---|---|---|
| 4,028,660 | 6/1977 | Pitts, Jr. | 340/856 |
| 4,126,287 | 11/1978 | Mendelsohn et al. | 174/35 MS |
| 4,189,618 | 2/1980 | Bretts et al. | 174/35 MS |
| 4,355,310 | 10/1982 | Belaigues et al. | 340/858 |
| 4,642,417 | 2/1987 | Ruthrof et al. | 174/109 X |

OTHER PUBLICATIONS

Mendelsohn et al., Glassy Metal Fabric, a Unique Magnetic Shield, IEEE Transactions on Magnetics, vol. Mag-12, No. 6, Nov. 1976, pp. 924–926.

Boll et al., Applicators of Amorphous Magnetic Materials in Electronics, IEEE Transactions on Magnetics, vol. MAG-17, No. 6, Nov. 1981, pp. 3053–3058.

Sellers, Gregory, Metglas Alloys An Answer to Low Frequency Magnetic Shielding IEEE 1972 Int. Symp. Electromagnetic Compat., Seattle, Washington, Aug. 1977, pp. 1–4.

*Primary Examiner*—Brian S. Steinberger

*Attorney, Agent, or Firm*—Cox & Smith Incorporated

[57] ABSTRACT

A broad band electrical signal transmission system comprising:

a first central conductor comprising: a plurality of conductive wire strands, a first insulating layer surrounding said wire strands, a conductive sheath surrounding said first insulating layer, and a second insulating layer surrounding said conductive sheath;

a second central conductor identical to said first central conductor;

a third insulating layer surrounding said first and second central conductors;

a tubular shield surrounding said third insulating layer, said tubular shield comprising a braid of composite wire wherein said composite wire comprises: a central core of an amorphous metal material, a conductive cladding surrounding said central core, and a layer of silver surrounding said conductive cladding; and a dielectric sheath surrounding said tubular shield.

2 Claims, 1 Drawing Sheet

SHIELDED CABLE

BACKGROUND OF THE INVENTION

This invention relates to Broadband (e.g., zero to 100 KHz) transmission lines and shieldings therefor. More specifically, it elates to an improved type of shielded cable capable of continuous dependable service at extreme temperatures or under conditions of fluctuating high electrical and magnetic fields, yet quite flexible, with a high degree of flexing endurance and compact construction. This invention also relates to a communication system allowing the exchange of information between a central station and several data acquisition and transmission stations via a signal transmission line or cable in the borehole logging field.

In that borehole logging field, logging measurements of the characteristics of the different earth formations traversed by a borehole are generally carried out by lowering into the borehole a tool suspended by a cable. The cable is provided with a single or several electric wires for the transfer of data signals from the tool to a reception station on the surface. In order to reduce logging time, it is necessary to perform the measurements as rapidly as possible. To achieve this, it is customary to simultaneously lower into the borehole several tools. The information from the different tools is sampled and transmitted to the surface by means of a communication system. There are known communication systems specially designed to carry to the surface the logging data sent by tools lowered into boreholes. One such system is described, for example, in the U.S. Pat. No. 4,355,310 issued Oct. 19, 1982 to Belaigues et al and commonly assigned along with this application to Schlumberger Technology Corporation. The disclosure of the aforementioned U.S. Pat. No. 4,355,310 is incorporated herein by reference and made a part hereof.

Whenever several tools are lowered at a time into a borehole, these tools are connected end to end if this is possible. The tools are coupled over a bi-directional bus which extends from one end of the downhole apparatus to the other substantially as described in the Belaigues et al patent. Preferably, each tool is provided with a "universal" (i.e., identical) interface which is connected to the bi-directional bus in parallel. The bidirectional bus provides the sole transmission path for the information-bearing and control signals transmitted between the tools and a downhole controller coupled to the cable wires. The term "data signals" is used in this sense to mean signals which carry instructions, data, addresses and the like. In other words, all the connections to the tools, with the exception of power connections, are made through the bus.

This coupling of the tools via the bus creates some difficulty as the data signals being carried by the bus are affected by high magnetic and electric fields, e.g., due to power supplies, etc., which must be shielded against. Further, since space in the downhole tools is at a premium, the design of the shielding must be such as to economize space and allow for a high degree of flexibility and durability of the cable while preserving the integrity of the shield. These problems are exacerbated as power availability downhole is limited with the result that the data being carried along the bus lines is usually characterized by a low signal to noise ratio.

Various cable shielding arrangements have been attempted by the prior art. Notable among which is a silver coated copper wire material which is formed in a cable braid by contiguous helical windings around the cable to be shielded. Another type of material used specifically for magnetic shielding is amorphous material with soft magnetic behavior also generally known under the name "Metglas" which is a Trademark of Allied Signal Corporation. These Metglas materials are described along with their uses in an article by Ball et al, entitled "Application of Amorphous Magnetic Materials in Electronics," published in IEEE Transactions on Magnetics 6 (1981).

SUMMARY OF THE INVENTION

It is thus the object of the present invention to provide a unique and improved shielded cable capable of continuous operation under ambient temperatures in the 200° C. range and also capable of withstanding thousands of cycles of bending without undue deterioration, particularly as to the characteristics of the cable shielding.

In accordance with principles of the present invention to employ amorphous metal in wire form which lends itself naturally to the standard processes used to form shields around electrical cables. The amorphous metal material has the advantages of very high initial permeability, low susceptability to degradation of magnetic properties from mechanical handling, and high permeability at extended frequencies. The wire form has the advantages of being more suitable for arrangement in a manner, such as by weaving, to improve flexibility and flexing endurance.

In accordance with further principles of the invention an amorphous wire is plated with a relatively thick layer of a high conductivity metal. The coated amorphous metal wire may then be woven into a cylindrical shield to surround the outside of the cable. The woven wire form affords a symmetry or an evenness of magnetic shielding coverage, which cannot be achieved as well by forms such as served or spiral braid. Further, the coated wire form can also be woven to provide a dense shielding coverage for both electrical and magnetic fields, yet which can still be flexed, without sacrificing either coverage or flexibility. Moreover, the mechanical properties of the amorphous wire can be chosen to be very strong and suitable from a tensile and yield strength standpoint as most suitable as a weavable strength member of a cable and to have the higest magnetic permeability. This wire can be plated by methods known to those familiar with the art, such as by electroplating, sputtering, flame spray, coextruding, cladding, etc. with a highly conductive material such as copper or silver.

Yet in further accordance with principles of the present invention, this surface plating or cladding of the high conductivity material is found to be efficient for conductivity shielding and complementary to the high permeability of the amorphous metal wire itself in providing the widest and most improved frequency shielding coverage. This is due in part to the phenomenon of conductivity through skin-effect where conductivity is effected mostly at the surface and not in the interior of a conductive wire. In the present invention the conductive material is thus optimally located with no wastage of the core of the wire. This location has the additional benefit of a compact design where the permeability and conductivity materials are combined and of further improving the mechanical properties of the amorphous metal wire core itself by the proper choice of the cladding material properties. In addition the cladding may provide corrosion resistance at high temperature in high humidity environments such as borehole logging.

The manner in which the foregoing principles and objects are accomplished will be described in greater detail in connection with the drawings attached to and forming a part of the present specification.

DESCRIPTION OF THE PREFERRED EMBODIMENTS

Figure 1:
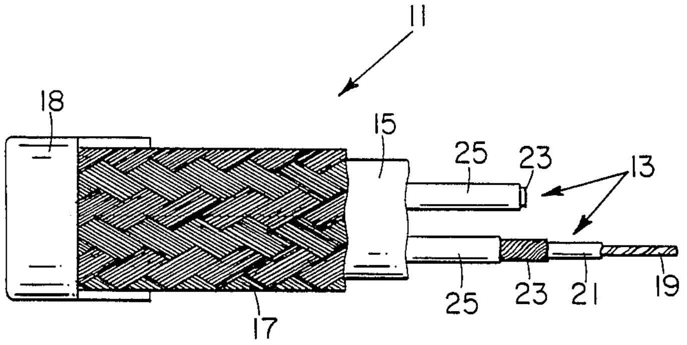
FIG. 1 illustrates a detailed side elevation view of a portion of a shielded cable construction, with the outer jacket and the successive layers of which the cable is formed shown cut back to illustrate the details thereof.

As will be observed from FIG. 1, the basic parts of the bus cable 11 are two identical central conductors 13, which are loosely enclosed in a cylindrical semi-solid polymeric fluoracarbon (Teflon) dielectric layer 15 surrounded by a tubular shield 17. A second dielectric layer 18, is in the form of a continuous sheath is arranged around the shield 17. The parts 11, 13, 15, 17 and 18 thus comprise a shielded cable suitable for use in the borehole environment.

In the present preferred embodiment of the shielded cable 11, each of the two central conductors 13 consists of seven strands 19 of American wire gauge size twenty one, silver covered copper wire. The nominal diameter of each strand of this wire is 0.0285 inch, whereby the inside conductor has a nominal diameter of 0.85 inch with a lay of 0.7 to 1.3 inches. The wire strands 19 are surrounded by a semi-solid polymeric fluorocarbon dielectric insulating layer 21 and a conductive tubular outer sheath 23. A second dielectric layer in the form of a continuous coaxial cover 25 may be provided around the outer sheath 23. As illustrated, the tubular shield 17 consists of a layer of braid formed of 168 strands of silver-plated copper coated Metglas composite wire, in twenty four carriers of seven strands each. Each wire being approximately the size of No. 32 American wire gauge. The amorphous metal Metglas can be obtained in wire form from the aforementioned Allied Signal Corporation, Florham Park, N.J.

Figure 2:
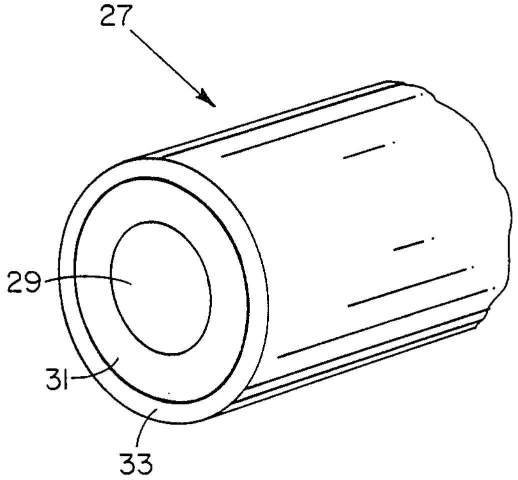
FIG. 2 illustrates a cross-sectional view of a single strand of a composite wire used in the shielded cable construction of FIG. 1.

With particular reference now to FIG. 2 of the Drawings, a single composite wire 27 of the shield 17 is illustrated. The composite wire 27 is provided with a structure including a central wire core 29 of a material characterized by and preferrably formed from an amorphous metal wire. A cladding 31 surrounds the central core 29 around its periphery and is made of a material having high conductivity at higher frequencies. The cladding 31 is advantageously formed of a thick layer of copper which is deposited on the central core 29 by means such as sputtering. The diameter of the central core 29 is chosen to be a nominal thickness of an inch. The cladding 31 is in turn coated with a thin layer of silver 33 to protect it from oxidation. It will be appreciated that these thickness measurements are provided for illustrative purposes only. Many factors enter into the determination of such thickness measurements depending on the particular shielding application. Without departing from the principles of the invention, however, the thickness of the copper layer should be chosen to provide sufficient electrical field shielding.

The composite structure illustrated for the wire 27 has many advantages in affording a unique shielding arrangement for cables. This composite structure, when suitably employed affords an arrangement capable of providing a unique and improved shielding for a cable capable of continuous operation under ambient temperatures in the 200° C. range and also capable of withstanding thousands of cycles of bending without undue deterioration, particularly as to the shielding characteristics of the cable shield.

The amorphous metal is advantageously employed in wire form which lends itself naturally to the standard processes used to form shields around electrical cables. The amorphous metal material has the additional advantages of very high initial permeability, low susceptability to degradation of magnetic properties from mechanical handling, and high permeability at extended frequencies. The wire form has also the advantages of being more suitable for arrangement in a manner, such as by weaving, to improve flexibility and flexing endurance and to provide a symmetrical coverage which is important in magnetic shielding.

In accordance with another embodiment of the invention, the composite wire 27 is woven into the cylindrical shield 17 to surround the outside of the cable 11 and may be also used in place of the outer sheath 23 of central conductors 13. The woven wire form affords an evenness and symmetry of magnetic shielding coverage, which cannot be achieved as well by forms such as served or spiral braid. Further, the composite wire 27 can also be woven to provide a dense shielding coverage for both electrical and magnetic fields, yet can still be flexed, without sacrificing either coverage or flexibility. The mechanical properties of the amorphous metal wire core 29 can be chosen to be very strong and suitable from a tensil and yield strength standpoint as most suitable as a weavable strength member of a cable and to have the highest magnetic permeability. These properties are further enhanced by the properties of the cladding material 31. Cladding 31 can be plated on by methods known to those familiar with the art, such as by electroplating, sputtering, flame spray, coextruding, etc. An important feature, however, in the use of any of those methods is the degree of bonding between the central core 29 and the cladding 31 which degree of bonding should be very high.

This surface high conductivity plating or cladding is found to be efficient for Electric Field shielding and complementary to the high permeability Magnetic Field Shielding of the wire itself in providing the widest and most complete frequency shielding coverage and by further improving the mechanical properties of the amorphous metal wire itself. This is due in part to the fact that conductivity is achieved through skin-effect where only an outer layer is effective and the core, even if conductive, plays little role. Therefore, that "wasted" core space is utilized in this invention to locate the material which effects the magnetic shielding.

Having thus described our invention, what we claim as new and desire to secure by United States Letters Patent is defined in the appended claims:

1. A broad band electrical signal transmission system comprising:

a first central conductor comprising: a plurality of conductive wire strands, a first insulating layer surrounding said wire strands, a conductive sheath surrounding said first insulating layer, and a second insulating layer surrounding said conductive sheath;

a second central conductor identical to said first central conductor;

a third insulating layer surrounding said first and second central conductors;

a tubular shield surrounding said third insulating layer, said tubular shield comprising a braid of composite wire wherein said composite wire comprises: a central core of an amorphous metal material, a conductive cladding surrounding said central core, and a layer of silver surrounding said conductive cladding; and a dielectric sheath surrounding said tubular shield.

2. The system of claim 1 wherein said conductive cladding is formed of copper.

* * * * *